United States Patent [19]

Ohba et al.

[11] Patent Number: 5,075,349

[45] Date of Patent: Dec. 24, 1991

[54] RADIATION-CURABLE POLYMERIC COMPOSITION CONTAINING A DIORGANOPOLYSILOXANE WITH (METH)ACRYLOXY END GROUPS

[75] Inventors: Toshio Ohba; Kenichi Isobe, both of Annaka, Japan

[73] Assignee: Shin-Etsu Chemical Co., Ltd., Tokyo, Japan

[21] Appl. No.: 529,927

[22] Filed: May 29, 1990

[30] Foreign Application Priority Data

Jun. 1, 1989 [JP] Japan ................................. 1-139618

[51] Int. Cl.$^5$ ...................... C08F 283/12; C08F 30/08
[52] U.S. Cl. ...................................... 522/99; 525/479; 526/279
[58] Field of Search ....................... 522/99; 525/479; 526/279

[56] References Cited

U.S. PATENT DOCUMENTS 4,201,808  5/1980  Cully et al. ........................ 428/447
4,508,884  4/1985  Wittmann et al. .................... 522/99

FOREIGN PATENT DOCUMENTS 3117024  5/1988  Japan ................................. 522/99

*Primary Examiner*—Marion E. McCamish
*Assistant Examiner*—Susan Berman
*Attorney, Agent, or Firm*—Wyatt, Gerber, Burke and Badie

[57] ABSTRACT

A radiation-curable surface-releasing agent is proposed which is capable of giving surface releasability to a substrate surface by irradiation with electron beams or ultraviolet light exhibiting outstandingly low peeling resistance against peeling of pressure-sensitive adhesive tapes applied and bonded to the release-treated surface and very small migration of the releasing ingredient toward the adhesive surface. The surface-releasing agent is a composition comprising a linear diorganopolysiloxane having, only at one of the molecular chain ends, at least one (meth)acryloxy groups and a poly(meth)acrylate compound such as trimethylol propane tri(meth)acrylate, diethylene glycol di(meth)acrylate, pentaerithritol tri(meth)acrylate and the like.

6 Claims, No Drawings

RADIATION-CURABLE POLYMERIC COMPOSITION CONTAINING A DIORGANOPOLYSILOXANE WITH (METH)ACRYLOXY END GROUPS

BACKGROUND OF THE INVENTION

The present invention relates to a novel radiation curable or -crosslinkable polymeric composition or, more particularly, to a novel radiation curable or crosslinkable polymeric composition comprising a specific organopolysiloxane, which is suitable to form, with a relatively small dose of irradiation with a radiation such as electron beams, a cured surface film on a substrate surface having releasability against adhesives or sticky substances and useful as a back-surface treatment agent of pressure sensitive adhesive tapes or surface treatment agent of release paper for pressure-sensitive adhesive labels and the like, hereinafter referred to as a surface releasing agent.

It is well known that a variety of organopolysiloxanes or compositions thereof are used in the application as a surface-releasing agent, of which organopolysiloxanes having two or more of (meth)acryloxy, i.e. acryloxy or methacryloxy groups in a molecule are widely used as a radiation curable surface-releasing agent (see, for example, Japanese Patent Publication 52-3190) by virtue of their crosslinkability by the irradiation with electron beams. Further, Japanese Patent Publication 53 36515 teaches a radiation curable surface-releasing agent comprising an organopolysiloxane of the above mentioned type and a sensitizer.

Such a (meth)acryloxy-containing organopolysiloxane or a composition based thereon has a problem that the surface-releasability against adhesive materials is necessarily decreased when the density of the (meth)acryloxy groups in the organopolysiloxane is increased with an object to obtain improved radiation crosslinkability. This is presumably due to the great polarity of the (meth)acryloxy groups which is responsible for the increase in the surface tension of the coating agent and the peeling resistance when a pressure-sensitive adhesive tape is applied and bonded to the release-treated surface and then peeled off. This disadvantage can be partly overcome by admixing the (meth)acryloxy containing organopolysiloxane with a dimethylpolysiloxane of a straightly linear molecular structure having a high molecular weight but no radiation-crosslinkability (see, for example, Japanese Patent Publication 62-30234). Though not ineffective in improving the surface releasability, such an organopolysiloxane composition has a problem that the coating film produced by the electron beam irradiation of low dose is poor in respect of the residual adhesiveness. Alternatively, a proposal has been made in Japanese Patent Publication 57 57096 for the combined use of an organopolysiloxane having (meth)acrylox groups and an (meth)acrylate ester compound of a polyhydric alcohol or a (meth)acryloxy-containing organopolysiloxane of a low molecular weight. Such an organopolysiloxane composition, however, is not quite satisfactory as a surface-releasing agent due to the relatively poor releasability characteristics when a coating film thereof is cured by the irradiation with radiations even though satisfactory relative to the radiation curability and the residual adhesiveness.

SUMMARY OF THE INVENTION

The present invention accordingly has an object to provide a novel polymeric composition comprising an organopolysiloxane which is radiation curable to give a surface-releasing coating film having a good balance between the radiation-crosslinkability and the surface-releasing characteristics without the above described problems and disadvantages in the prior art organopolysiloxanes or compositions based thereon.

Thus, the polymeric composition unexpectedly discovered in the course of the investigations conducted with the above mentioned object is a novel composition which comprises, as a mixture: (a) from 5 to 95 parts by weight of an organopolysiloxane of a linear molecular structure having, at only one of the molecular chain ends, at least one (meth)acryloxy group of the formula $CH_2=CR^1-CO-)-$, in which $R^1$ is a hydrogen atom or a methyl group; and (b) from 95 to 5 parts by weight of a (meth)acrylate ester compound of a polyhydric alcohol represented by the general formula $$(CH_2=CR^1-CO-O-)_pR^2, \qquad (I)$$

in which $R^1$ has the same meaning as defined above, the subscript p is a positive integer not exceeding 6 and $R^2$ is a residue of a polyhydric alcohol or a partial ester of a polyhydric alcohol with a polybasic carboxylic acid obtained by removing p in number of the hydroxy groups In a molecule of the polyhydric alcohol or the partial ester of a polyhydric alcohol with a polybasic carboxylic acid.

DETAILED DESCRIPTION OF THE PREFERRED EMBODIMENTS

As is described above, the radiation curable polymeric composition of the present Invention is characterized by the unique formulation comprising a specific organopolysiloxane as the component (a) and a (meth)acrylate ester compound of a polyhydric alcohol as the component (b) in a specified weight proportion. The thus formulated composition of the invention is curable by the irradiation with electron beams in a dose of 2 to 4 Mrad or with ultraviolet light coming from, for example, a high pressure mercury lamp to give a cured surface-releasing coating film of which the peeling resistance of a pressure-sensitive adhesive tape can be as small as 5 to 250 g/5 cm and the residual adhesiveness can be as high as 93 to 100%.

The component (a), which is an organopolysiloxane of a unique molecular structure, serves to decrease the peeling resistance of an adhesive tape from the surface having a cured coating film of the inventive composition. The organopolysiloxane as the component (a) is a diorganopolysiloxane having a substantially linear molecular structure and having at least one (meth)acryloxy group of the formula $CH_2=CR^1-CO-O-$, in which $R^1$ is a hydrogen atom or a methyl group, at only one of the molecular chain ends, the other molecular chain end being free of (meth)acryloxy groups. The (meth)acryloxy group is essential because use of a diorganopolysiloxane having no (meth)acryloxy group in place of the above defined component (a) may result, though not disadvantageous in respect of the surface-releasability, in the phenomenon of bleeding of the organopolysiloxane out of the coating film so that the organopolysiloxane bled out is transferred to the surface of the adhesive tape to cause a great loss in the adhesiveness of the surface.

Further, it is essential that, when the organopolysiloxane has two or more of the (meth)acryloxy groups in a molecule, the (meth)acryloxy groups are localized at only one of the molecular chain ends, the other molecular chain end being free of the (meth)acryloxy groups. When an organopolysiloxane having two or more of (meth)acryloxy groups bonded to an extra silicon atom or atoms in addition to the silicon atom at one of the molecular chain ends is used in place of the above defined component (a), the molecules of the organopolysiloxane are co-crosslinked with the component (b) to be rigidly immobilized in the cured coating layer so that the peeling resistance of an adhesive tape from the release-coated surface would be increased more or less. In other words, it is presumable that the molecular chains of the organopolysiloxane are left in a mobile condition on the release-coated substrate surface contributing to the decrease in the peeling resistance even after curing when the organopolysiloxane molecules each have the (meth)acryloxy group or groups only at one molecular chain end to be copolymerized with the component (b).

It is of course that the radiation curability of the inventive composition is increased so much by increasing the number of the (meth)acryloxy groups bonded to one of the silicon atoms at the molecular chain ends. In this regard, it is preferable that at least three (meth)acryloxy groups are bonded to the silicon atom at one of the molecular chain ends. The upper limit of the number of the (meth)acryloxy groups at one molecular chain end, however, is 9 in respect of the difficulty in the synthetic preparation of an organopolysiloxane having a larger number of the (meth)acryloxy groups at one molecular chain end in addition to the problem that the peeling resistance of an adhesive tape is increased when a too large number of the (meth)acryloxy groups are bonded to the silicon atom at one molecular chain end.

Following is a description of the synthetic procedure for the preparation of the above defined specific organopolysiloxane compound having at least one (meth)acryloxy group at only one of the molecular chain ends. In the first place, a hexaorgano cyclotrisiloxane of the formula $(-SiR_2-O-)_3$, e.g., hexamethyl cyclotrisiloxane, is subjected to a ring-opening polymerization reaction with a triorganosilanol of the formula $R_3SiOH$, e.g., trimethyl silanol, as the chain stopper agent in the presence of a pentacoordinate organosilicon compound such as the compound expressed by the following formula

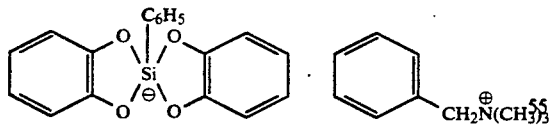

as a catalyst so as to give a linear diorganopolysiloxane blocked at only one of the molecular chain ends with a silanolic hydroxy group and represented by the general formula

In the above given formulas, R is an unsubstituted or substituted monovalent hydrocarbon group exemplified by alkyl groups, e.g., methyl, ethyl, propyl, butyl and octyl groups, alkenyl groups, e.g., vinyl and allyl groups, and aryl groups, e.g., phenyl and tolyl groups, as well as those substituted groups obtained by replacing a part or all of the hydrogen atoms in the above named hydrocarbon groups with halogen atoms, cyano groups and the like, e.g., chloromethyl, 3,3,3-trifluoropropyl and 2 cyanoethyl groups, and n is a positive integer larger than 3. It is preferable that at least 80% by moles of the groups denoted by R are methyl groups in respect of the low Peeling resistance of an adhesive tape from the surface coated with a cured layer of the composition.

The second step is the dehydrochlorination reaction of the above obtained one-end OH-blocked diorganopolysiloxane with a diorganochlorosilane, e.g., dimethyl chlorosilane, of the general formula $R_2HSiCl$, R being the same as above, in the presence of an acid acceptor such as triethyl amine to give a one-end SiH terminated diorganopolysiloxane represented by the general formula

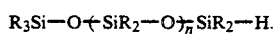

The next step is the addition reaction or the so called hydrosilation reaction between the above obtained one-end SiH terminated diorganopolysiloxane and an alkenyl-containing or, preferably, a vinyl group containing organosilane compound represented by the general formula

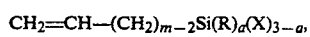

in which R has the same meaning as defined above, m is zero or a positive integer not exceeding 4, a is zero, 1 or 2 and X is a halogen or, preferably, chlorine atom or an alkoxy group, e.g., methoxy and ethoxy groups, in the presence of a platinum compound as a catalyst to give a one end SiX-terminated diorganopolysiloxane represented by the general formula

The last step of the synthetic process to give the organopolysiloxane as the component (a) is the dehydrohalogenation reaction, when X is a halogen atom, or dealcoholation condensation reaction, when X is an alkoxy group, with a compound having at least one (meth)acryloxy group and one hydroxy group simultaneously in a molecule in the presence of a suitable acceptor for the hydrogen halide or catalyst for the dealcoholation reaction. Examples of such a (meth)acryloxy and hydroxy-containing compound include those expressed by the following structural formulas, in which the symbol Me is a methyl group and Q is an acryloxy group $CH_2=CH-CO-O-$ or a methacryloxy group $CH_2=Cme-CO-O-$:

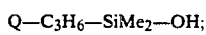

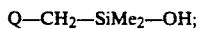

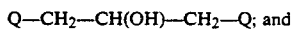

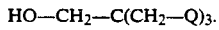

Following formulas are several of the examples expressing the organopolysiloxane suitable as the component (a) in the inventive composition, in which R has the same meaning as defined above, $Q^1$ is an acryloxy group, $Q^2$ is a methacryloxy group and n is a positive integer:

$R_3Si-O-(SiR_2-O)_n-SiR_2-C_3H_6-Q^1$;

$R_3Si-O-(SiR_2-O)_n-SiR_2-O-SiR_2-C_2H_4-SiR_2-CH_2-Q^1$;

$R_3Si-O-(SiR_2-O)_n-SiR_2-O-SiR_2-C_2H_4-Si(-O-SiR_2-C_3H_6-Q^1)_3$;

$R_3Si-O-(SiR_2-O)_n-SiR_2-O-SiR_2-C_2H_4-SiR-[-O-CH(-CH_2-Q^1)(-CH_2-Q^2)]_2$;

$R_3Si-O-(SiR_2-O)_n-SiR_2-O-SiR_2-C_2H_4-SiR-[-O-CH_2-C(-CH_2-Q^1)_3]_2$; and $R_3Si-O-(SiR_2-O)_n-SiR_2-O-SiR_2-C_2H_4-Si-[-O-CH_2-C(-CH_2-Q^1)_3]_3$.

It is preferable that the organopolysiloxane as the component (a) has an average degree of polymerization not exceeding 100 since an organopolysiloxane having an average degree of polymerization exceeding 100 may have an effect to decrease the adhesiveness of the pressure-sensitive adhesive tape applied and bonded to the surface treated with the inventive composition. It is also preferable that the value of n in the above given formulas is at least 3 since the releasability of the composition against an adhesive or sticky substance is unduly decreased by formulating with an organopolysiloxane having a too small degree of polymerization.

The component (b) in the inventive composition, which serves to enhance the adhesion of the coating layer of the composition to the substrate surface after the radiation-induced curing, is a poly(acrylate) or poly(methacrylate) ester compound represented by the general formula $Q_pR^2$, in which Q is a (meth)acryloxy group and $R^2$ is a residue of a polyhydric alcohol or a partial ester of a polyhydric alcohol with a polybasic carboxylic acid. The subscript p is a positive integer not exceeding 6. The residue $R^2$ should have a valency of p in order to be combined with p in number of the groups denoted by Q. Examples of the compounds suitable as the component (b) include diethylene glycol diacrylate; tetraethylene glycol diacrylatei trimethylol propane triacrylate; pentaerithritol triacrylate, trimethylol propane trimethacrylate and the like.

The radiation curable organopolysdiloxane composition of the invention can be prepared by uniformly blending the above defined components (a) and (b). The blending ratio of the component (a) to component (b) is in the range from 5:95 to 95:5 by weight and should be adequately selected within this range depending on the particular application of the composition. When the amount of the component (a) is too small, the composition cannot give a cured coating film on a substrate surface having a sufficiently small peeling resistance against peeling of an adhesive tape applied and bonded to the release-treated substrate surface. When the amount of the component (a) is too large, on the other hand, the radiation-curability of the composition is unduly decreased along with a decrease in the adhesion of the cured coating film to the substrate surface.

The radiation-curable organopolysiloxane composition of the present invention prepared in the above described manner is useful as a back surface treating agent for pressure-sensitive adhesive tapes and sheets, protective coating agent on substrates of metals, plastics and the like, vehicle base of paints and so on.

When the inventive organopolysiloxane composition is applied to the surface of a substrate material such as paper, plastic films, metal foils and the like with an object to impart surface releasability, the thickness of coating is usually in the range from 0.1 to 200 μm but naturally depends on the sticking power of the adhesive or sticky substance against which the surface-releasing treatment is undertaken. The coating machine used in the coating work is not particularly limitative including bar coaters, gravure coaters, reverse coaters, rod coaters, offset printing machines and the like. The thus formed coating film of the inventive composition can be readily cured to exhibit excellent surface releasability by the irradiation with a radiation such as electron beams and ultraviolet light. When electron beams are used as the radiation source, complete cure of the composition can be achieved with a dose of, for example, 2 Mrad or larger or, in most cases, 2 to 5 Mrad. When ultraviolet light is used as the radiation, an irradiation time of 0.1 to 10 seconds is usually sufficient by using a high-pressure mercury lamp of an output of 2 kilowatts or 80 watts/cm held 8 cm above the coated surface under irradiation. It is preferable when a coating layer of the inventive composition is to be radiation cured with ultraviolet light that the composition is admixed with a photosensitizer such as benzophenone, 4-chlorobenzophenone, 4,4'-dimethoxy benzophenone, acetophenone, 4-methyl acetophenone, benzoin methyl ether, benzoin trialkylsilyl ethers and the like.

It is of course optional according to need that the inventive composition is admixed with various kinds of known additives including levelling agents, antistatic agents, defoaming agents, coloring agents and the like as well as organic solvents to facilitate the coating work with the inventive composition.

In the following, the invention is described in more detail by way of examples including a description of the typical process for the preparation of the organopolysiloxane as the component (a) and formulation and application of the composition as a surface releasing agent. In the following description, the term of "parts" always refers to "parts by weight" and the values of viscosity are all those obtained by the measurement at 25° C. The effectiveness of the surface releasing treatment with the composition was evaluated in terms of the peeling resistance and the residual adhesiveness determined by the following procedures.

Peeling resistance

A specified Pressure sensitive adhesive tape (Lumirar 31B Tape, a product by Nitto Denko Co., Japan) was applied and bonded to the surface of a substrate after the surface-releasing treatment and kept for 72 hours at 70° C. under a load of 20 g/cm² and the adhesive tape was then peeled off at 25° C. by pulling in the 180° direction using an automatic tensile tester at a pulling velocity of 30 cm/minute to record the resistance against peeling in g per 5 cm width of the tape.

Residual adhesiveness

The value of the residual adhesiveness was given as a % ratio of the value of the peeling resistance determined by peeling an adhesive tape, which was taken by peeling off from the release-treated substrate surface in the above described peeling resistance test and then applied and bonded to a well-polished clean stainless steel plate, off the stainless steel plate to the value of the peeling resistance determined in just the same manner as above excepting replacement of the release-treated substrate with a clean Teflon plate. A larger value of this residual adhesiveness means a smaller fraction of uncured organopolysiloxane in the surface-releasing coating film which may migrate from the release-treated substrate surface to the pressure sensitive adhesive tape to decrease the adhesiveness of the tape. In other words, the value of residual adhesiveness can be used as a measure of the curability of the radiation-curable composition.

Synthetic Preparation 1.

Into a four-necked glass flask of 1 liter capacity were introduced 666 g (3 moles) of hexamethyl cyclotrisiloxane, 90 g (1 mole) of trimethyl silanol and 0.1 g of a pentacoordinate organosilicon compound expressed by the formula

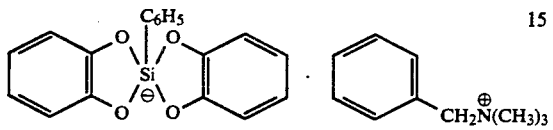

as a catalyst to form a reaction mixture, which was heated at 80° C. for 16 hours under agitation to effect the ring-opening polymerization reaction of the cyclic trisiloxane. The product was a one-end silanol-terminated dimethyl polysiloxane having an average degree of polymerization of 10 and expressed by the formula

in which Me is a methyl group.

in the next place, the thus obtained one-end silanol-terminated dimethyl polysiloxane was admixed with 110 g of triethyl amine and then 94.5 g (1.0 mole) of dimethyl monochlorosilane were added dropwise to the mixture in the flask, which was agitated for 5 hours at 25° C. The product was a one-end SiH terminated dimethyl polysiloxane having an average degree of polymerization of 11 expressed by the formula

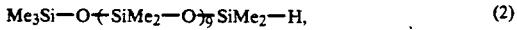

in which Me is a methyl group.

Then, 162.8 g (0.2 mole) of the one end SiH-terminated dimethyl polysiloxane of the formula (2), 32.3 g (0.2 mole) of vinyl trichlorosilane, 200 g of toluene and 0.1 g of a 2% solution of chloroplatinic acid in n-butyl alcohol were introduced into a four-necked flask of 500 ml capacity and the mixture was heated at 100° C. for 5 hours under agitation to effect the hydrosilation reaction. The reaction mixture was examined by the infrared absorption spectrophotometry which indicated complete disappearance of the absorption band at the wave number of 2160 cm$^{-1}$ assignable to the Si-H bond. The product was a dimethyl polysiloxane blocked at one molecular chain end with a 2-trichlorosilylethyl group and expressed by the formula

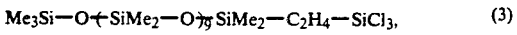

in which Me is a methyl group.

In the last step of the synthetic procedure, 97.6 g (0.1 mole) of the above obtained one-end trichlorosilylethyl-terminated dimethyl polysiloxane of the formula (3), 89.4 g (0.3 mole) of pentaerithritol triacrylate, 187 g of toluene, 88.2 g of triethyl amine and 0.08 g of di tert butyl hydroxytoluene were introduced into a four necked flask of 500 ml capacity and the mixture was heated at 70° C. for 3 hours under agitation to effect the dehydrochlorination reaction. The precipitates of triethylamine hydrochloride were removed from the reaction mixture by filtration and the filtrate was stripped of the volatile matter including the solvent by heating under reduced pressure to give 158 g of a clear, light yellow liquid product having a viscosity of 120 centipoise. This product, referred to as the polysiloxane A hereinbelow, could be assumed to be expressed by the formula

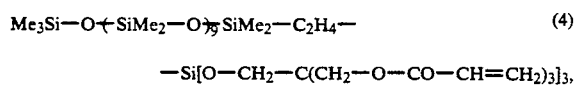

having nine acryloxy groups localized at one molecular chain end.

Synthetic Preparation 2.

A one-end SiH-terminated dimethyl polysiloxane expressed by the formula

in which Me is a methyl group was prepared in substantially the same manner as in Synthetic Preparation 1 described above and 229.4 q (0.5 mole) of the same were admixed and reacted with 7.1 g (0.05 mole) of vinyl methyl dichlorosilane, in place of vinyl trichlorosilane, to give a one-end 2-(methyl dichlorosilyl)ethyl-terminated dimethyl polysiloxane of the formula

In the next place, 236.5 g (0.05 mole) of the organopolysiloxane of the formula (6) and 21.4 g (0.1 mole) of glycerin 1 methacrylate-3-acrylate of the formula

in which $Q^1$ is an acryloxy group and $Q^2$ is a methacryloxy group, were mixed and subjected to a dehydrochlorination reaction in substantially the same manner as in Synthetic Preparation 1 to give 238 g of a clear, light yellow dimethyl polysiloxane, referred to as the polysiloxane B hereinbelow, of which the viscosity was 120 centipoise, having two acryloxy and two methacryloxy groups at one molecular chain end as expressed by the formula

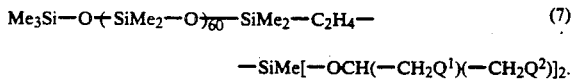

Synthetic Preparation 3.

A one-end SiH-terminated dimethyl polysiloxane expressed by the formula

was prepared in substantially the same manner as in the preparation of the dimethyl polysiloxane of the formula (2) in Synthetic Preparation 1 excepting modification of the proportion of the hexamethyl cyclotrisiloxane and trimethyl silanol. Then, 236.8 g (0.1 mole) of this dimethyl polysiloxane and 12.1 g (0.1 mole) of dimethyl vinyl chlorosilane were subjected to the hydrosilation reaction in the same manner as in the preparation of the dimethyl polysiloxane of the formula (3) to give a one-end 2-(dimethyl chlorosilyl)ethyl terminated dimethyl polysiloxane expressed by the formula $$Me_3Si-O+SiMe_2-O\overline{)_{30}}-SiMe_2-C_2H_4-SiMe_2Cl. \quad (9)$$

In the last step, 125.4 g (0.05 mole) of the thus obtained dimethyl polysiloxane of the formula (9) and 9.4 g (0.5 mole) of 3-acryloxypropyl dimethyl silanol of the formula $$Q^1-C_3H_6SiMe_2OH,$$

were subjected to the dehydrochlorination reaction with triethyl amine as the acid acceptor in the same manner as in Synthetic Preparation 1 to give 119 g of a clear and colorless liquid product having a viscosity of 50 centipoise. This product, referred to as the polysiloxane C hereinbelow, could be assumed to be expressed by the formula $$Me_3Si-O+SiMe_2-O\overline{)_{30}}-SiMe_2-C_2H_4- \quad (10)$$

$$-SiMe_2-O-SiMe_2C_3H_6Q^1.$$

Application Example 1.

A sheet of polyethylene laminated paper was coated on the polyethylene surface with a coating composition prepared by uniformly blending 25 parts of the polysiloxane A obtained in Synthetic Preparation 1 and 75 parts of a polyfunctional acrylic resin (Aronix M7200, a product by Toa Gosei Kagaku Kogyo Co.) in a coating thickness of about 0.8 μm. The coating film was irradiated with electron beams in a dose of 2 Mrad in an atmosphere of nitrogen gas using a low-energy electron accelerator (Electrocurtain Model CB20d 50/30, a product by Energy Science Industry Co.) to find that the coating film was completely cured to firmly adhere to the substrate surface.

The thus formed cured coating film on the substrate surface was subjected to the tests of the peeling resistance and residual adhesiveness in the testing procedures described before using a pressure-sensitive adhesive tape Lumirar 31B (a product by Nitto Denko Co.) to find that the peeling resistance was 250 g/5 cm and the residual adhesiveness was 100%.

Application Example 2.

The experimental procedure was substantially the same as in Application Example 1 described above except that the coating composition was admixed with 4% by weight of benzoin isobutyl ether as a photosensitizer and the coating film on the substrate surface in a coating thickness of about 2.0 μm was irradiated, instead of the electron beam irradiation, in air for about 0.6 second with ultraviolet light using two high-pressure mercury lamps each having a linear output of 80 watts/cm and held at a distance of 8 cm above the substrate surface. The thus formed completely cured coating film firmly adhering to the substrate surface was subjected to the same tests as above to find that the peeling resistance was 180 g/5 cm and the residual adhesiveness was 98%.

Application Example 3.

The experimental procedure was just the same as in Application Example 1 excepting replacement of the polysiloxane A with the polysiloxane 8 prepared in Synthetic Preparation 2 and the mixing proportion by weight of the polysiloxane B and the polyfunctional acrylic resin (Aronix M7200) and the irradiation dose with the electron beams were varied as shown in Table 1 below. The coating films could also be completely cured with the indicated dose and the tests undertaken with the thus cured coating film gave results of the peeling resistance and the residual adhesiveness as shown in the table.

TABLE 1

| Polysiloxane B: Allonix, mixing ratio by weight | Dose of electron beams, Mrad | Peeling resistance, g/5 cm | Residual adhesiveness, % |
|---|---|---|---|
| 100:0 | 5 | 5 | 90 |
| 75:25 | 4 | 6 | 93 |
| 50:50 | 4 | 8 | 94 |
| 25:75 | 3 | 23 | 96 |
| 10:90 | 2 | 50 | 98 |
| 5:95 | 2 | 240 | 100 |
| 0:100 | 2 | >1,600 | 100 |

As a comparative test, the same experiment as above was repeated using the polysiloxane B alone or the polyfunctional acrylic resin alone was used as a coating material in place of the mixture of them to find that neither of them was satisfactory as a surface-releasing agent in respect of the poor radiation-curability and low residual adhesiveness with the former and in respect of the large peeling resistance with the latter.

Application Example 4.

A sheet of polyethylene-laminated paper was coated on the polyethylene surface with a coating composition prepared by uniformly blending 10 parts of the polysiloxane C obtained in Synthetic Preparation 3 and 90 parts of trimethylol propane triacrylate in a coating thickness of about 0.8 μm. The coating film was irradiated with electron beams in a dose of 3 Mrad in an atmosphere of nitrogen gas in the same manner as in Application Example 1 to find that the coating film was completely cured to firmly adhere to the substrate surface.

The thus formed cured coating film on the substrate surface was subjected to the tests of the peeling resistance and residual adhesiveness in the testing procedures described before to find that the peeling resistance was 10 g/5 cm and the residual adhesiveness was 98%.

What is claimed is:

1. An organopolysiloxane composition radiation curable to form a surface release agent which comprises, as a mixture:
    (a) from 5 to 95 parts by weight of an organopolysiloxane having a degree of polymerization of from 3 to 100 and a linear molecular structure having, at only one of the molecular chain ends, at least one (meth)acryloxy group of the formula $CH_2=CR^1-CO-O-$, in which $R^1$ is a hydrogen atom or a methyl group, the other end of the molecular chain being free from acryloxy or (meth) acryloxy groups, and
    (b) from 95 to 5 parts by weight of a (meth) acrylate ester compound of a polyhydric alcohol represented by the general formula: in which $R^1$ has the same meaning as defined above, the subscript p is a positive integer not exceeding 6 and $R^2$ is a residue of a polyhydric alcohol or a partial ester of a polyhydric alcohol with a polybasic carboxylic acid obtained by removing p in number of the hydroxy groups in a molecule of the polyhydric alcohol of the partial ester of a polyhydric alcohol with a polybasic carboxylic acid.

2. The radiation-curable organopolysiloxane composition as claimed in claim 1 wherein the subscript p in the formula representing the component (b) is 2, 3 or 4.

3. The radiation-curable organopolysiloxane composition as claimed in claim 2 wherein the component (b) is a compound selected from the group consisting of diethylene glycol diacrylate, tetraethylene glycol diacrylate, trimethylol propane triacrylate, pentaerithritol triacrylate and trimethylol propane trimethacrylate.

4. The radiation-curable organopolysiloxane composition as claimed in claim 1 wherein the amount of the component (a) is in the range from 5 to 25 parts by weight and the amount of the component (b) is in the range from 95 to 75 parts by weight.

5. The radiation-curable organopolysiloxane composition as claimed in claim 1 wherein the organopolysiloxane as the component (a) has a viscosity in the range from 30 to 1000 centipoise at 25 ° C.

6. The radiation-curable organopolysiloxane composition as claimed in claim 1 wherein the (meth)acrylate ester compound as the component (b) has a viscosity in the range from 30 to 10000 centipoise at 25° C.

* * * * *

UNITED STATES PATENT AND TRADEMARK OFFICE
CERTIFICATE OF CORRECTION

PATENT NO. : 5,075,349
DATED : December 24, 1991
INVENTOR(S) : Toshio Ohba and Kenichi Isobe It is certified that error appears in the above-identified patent and that said Letters Patent is hereby corrected as shown below:

Claim 1, paragraph (b), line 3 after "general formula" insert ---$(CH_2=CR^1-CO-O-)_p R^2$---

Claim 1, col. 11, line 1 change "of", second occurrence to read ---or---

Signed and Sealed this

Twenty-seventh Day of April, 1993

Attest:

MICHAEL K. KIRK

Attesting Officer  Acting Commissioner of Patents and Trademarks